United States Patent
Arquevaux et al.

(10) Patent No.: US 6,354,652 B1
(45) Date of Patent: Mar. 12, 2002

(54) AUTOMOBILE VEHICLE DOOR MODULE PROVIDED WITH A WINDOW RAISER WITHOUT A CABLE SHEATH

(75) Inventors: Laurent Arquevaux, Sully sur Loire; Carlo Bertolini, Feucherolles, both of (FR)

(73) Assignee: Meritor Light Vehicles System, L.L.C., Troy, MI (US)

( * ) Notice: Subject to any disclaimer, the term of this patent is extended or adjusted under 35 U.S.C. 154(b) by 0 days.

(21) Appl. No.: 09/041,573

(22) Filed: Mar. 12, 1998

(30) Foreign Application Priority Data

Mar. 21, 1997 (FR) .............................. 97 03489

(51) Int. Cl.⁷ ................................. B60J 5/00
(52) U.S. Cl. .............................. 296/146.5; 296/146.15; 296/146.2; 296/146.1; 49/352; 49/502; 49/348
(58) Field of Search ......................... 296/146.5, 146.16, 296/146.2, 146.1, 146.15; 49/352, 502, 348, 349

(56) References Cited

U.S. PATENT DOCUMENTS

| | | | | |
|---|---|---|---|---|
| 4,905,412 A | * | 3/1990 | Srock et al. | 49/352 |
| 5,033,236 A | * | 7/1991 | Szerdahelyi et al. | 49/502 |
| 5,632,121 A | * | 5/1997 | Handte et al. | 49/502 |
| 5,673,515 A | * | 10/1997 | Weber et al. | 49/352 |
| 5,694,717 A | * | 12/1997 | Gier | 49/352 |
| 5,809,695 A | * | 9/1998 | Strickland | 49/352 |
| 5,848,496 A | * | 12/1998 | Bertolini et al. | 49/352 |
| 5,946,858 A | * | 9/1999 | Staser | 49/352 |
| 5,950,365 A | * | 9/1999 | Lieb et al. | 49/352 |
| 6,050,029 A | * | 4/2000 | Simon et al. | 49/352 |
| 6,141,910 A | * | 11/2000 | Kobrehel et al. | 49/352 |
| 6,170,199 B1 | * | 1/2001 | Stenzel et al. | 49/502 |
| 6,283,534 B1 | * | 9/2001 | Mrozowski et al. | 296/146.2 |

FOREIGN PATENT DOCUMENTS

| | | |
|---|---|---|
| DE | 3627234 A1 | 2/1988 |
| FR | 2728008 A1 | 12/1994 |

* cited by examiner

Primary Examiner—Joseph D. Pape
Assistant Examiner—Kiran B. Patel
(74) Attorney, Agent, or Firm—Carlson, Gaskey & Olds

(57) ABSTRACT

A module (3) for the door (1) of an automobile vehicle comprises a window raiser mechanism (4) of the type having two substantially parallel rails (5) and driving cables (6) arranged in the form of an X between these rails and slidable relative to the latter, and a support for this mechanism. This support (9) has a generally X shape connecting the upper ends (5a) to the lower ends (5b) of the rails and enveloping the cables. This support may be, for example, formed by an X-shaped tubular structure rigidly interconnecting the two rails and enveloping the cables (6) whose sheaths, which were otherwise necessary, may be eliminated. The tubular structure (9) protects the cables against aggression and deterioration due to transport and mounting in the door.

15 Claims, 1 Drawing Sheet

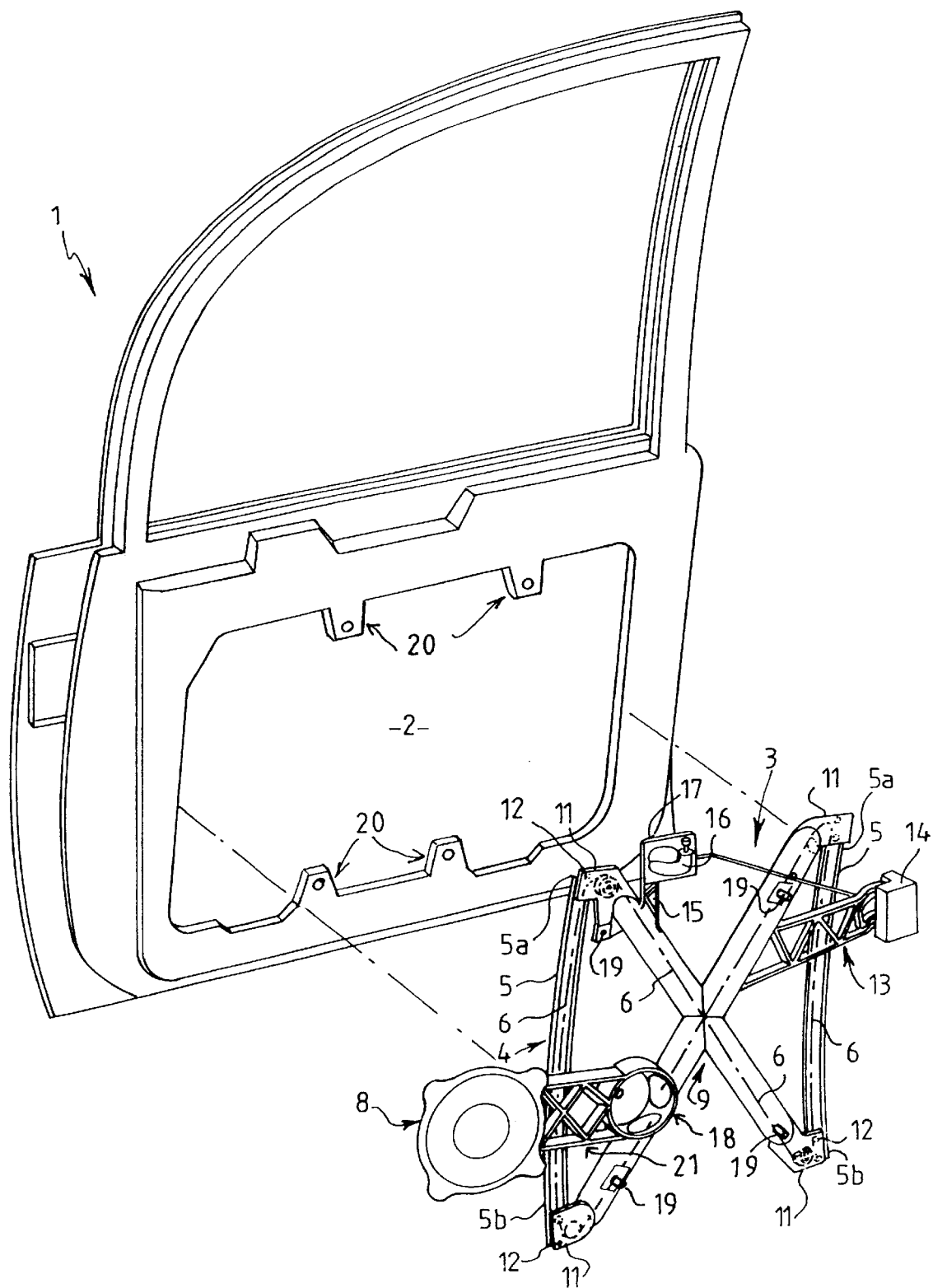

AUTOMOBILE VEHICLE DOOR MODULE PROVIDED WITH A WINDOW RAISER WITHOUT A CABLE SHEATH

BACKGROUND OF THE INVENTION

The present invention relates to an automobile vehicle door module comprising a window raiser mechanism of the type comprising two substantially parallel rails and driving cables arranged in the form of an X between these rails and sliding on the latter, and a support for this mechanism.

These devices are usually named "cable drum double lift mechanisms" and may be mounted on a mounting support with, for example, the lock and a speaker to form a module which facilitates the mounting of the assembly of these mechanisms in the door.

SUMMARY OF THE INVENTION

An object of the invention is to provide a door module made of plastic materials and arranged as to avoid the need for cable sheaths.

According to the invention, the support has a generally X-shape connecting the upper ends of the rails to their lower ends and enveloping the cables.

In this way the plate usually necessary for supporting the window raiser becomes superfluous, as the constituents of the window raiser and in particular its rails are connected by the X-shape of the support enveloping the cables. The support imparts sufficient rigidity to the assembly to enable it to be easily assembled when manufacturing the module, easily mounted in the door and capable of resisting the operating forces of the mechanisms when the latter are in use.

Owing to the fact that the X-shaped support envelopes or surrounds the cables, the latter are protected from aggressions due to transport or mounting, and the forces due to the tension of the cable in the operation of the window raiser are directly supported by the X-shaped structure, so that it is possible to eliminate the sheaths of the cables, which were necessary with previous designs.

Other features and advantages of the invention will be apparent from the following description, with reference to the accompanying drawing which illustrates an embodiment of the invention by way of a non-limitative example.

BRIEF DESCRIPTION OF THE DRAWING

The single FIGURE is an exploded perspective view of a vehicle door and an embodiment of the corresponding door module provided with a window raiser according to the invention.

DETAILED DESCRIPTION OF THE PREFERRED EMBODIMENT

The FIGURE shows an automobile vehicle door 1 whose box structure comprises an internal opening 2 adapted to receive a door module mechanism 4.

This window raiser 4 is of the type having two substantially parallel rails 5 preferably arranged substantially vertically, and driving cables 6 arranged in the form of an X between the rails 5 and slidably supported for movement relative to the rails 5.

In the known manner, the cables 6 are driven by a drum 3 comprising a window raiser (not shown) that rotates in a housing 18 in one piece with the support 9, which needs no particular description.

The module 3 comprises a support 9 for the window raiser 4 having a generally X shaped configuration and connecting the upper ends 5a to the lower ends 5b of the rails 5 while enveloping the cables 6.

In the embodiment illustrated in the drawing, the support is formed by an X-shaped tubular structure 9 made for example of molded plastic material in which the cable 6 can travel.

At its four ends, the tubular structure 9 is provided with plates 11 fixed on one hand to the ends of the branches of the structure 9 and on the other hand to the upper and lower ends 5a and 5b of the rails 5 by any conventional connecting means such as screws or rivets 12.

The tubular support 9 preferably is also provided with an arm 13 extending roughly horizontally and connected to one of the upper branches of the structure 9. A door lock 14 is secured to the end of the arm 13.

The tubular support 9 is also provided on one of the upper branches of its X-shaped structure, most preferably the branch situated on the front or forward side of the door, with a member formed by a lug 15 supporting a handle 16 for actuating the lock 14, by means of a fitting 17 fixed to one end of the lug 15. The arm 13 and the lug 15 may be formed as represented by ribbed structures or in any other suitable manner. The tubular support 9 preferably is also provided with an arm 21 extending from the housing 18 that supports a speaker 8 secured by any known means.

The rigid assembly formed in this way constitutes a door module that may be introduced in the opening 2 of the box structure of the door 1 and fixed inside the box structure by means such as screws or studs 19 that fix tabs 20 of the door 1 to the ends of the rails 5.

The tubular structure 9 supporting the window raiser 3 resists the forces due to the tension of the cables 6.

In another example embodiment, the illustrated tubular structure 9 is replaced by a ribbed structure in which the ribs have sufficient dimensions for protecting the cables 6 against aggressions and risk of deterioration due to transport and in the course of the mounting of the window raiser. In this case also the ribbed structure therefore permits eliminating the sheaths that previously were necessary for enveloping the cables.

The scope of the invention is not intended to be limited to the described embodiment and may include constructional variants. Thus any support structure performing the function of cable sheathing and therefore enabling the conventional sheaths of the cables to be eliminated are within the scope of the present invention as set forth in the following claims.

What is claimed is:

1. A window raiser mechanism for use in a vehicle, comprising:
    two substantially parallel rails each having a first end and a second end;
    driving cables arranged in the form of an X located between said rails and supported on said rails such that said cables are slidable relative to said rails;
    a support having a generally X-shape which connects said first ends of said rails to said second ends of said rails, said support enveloping said cables.

2. The mechanism according to claim 1, wherein said support is formed by an X-shaped tubular structure.

3. The mechanism according to claim 1, wherein said support is formed by a ribbed structure in which the ribs have sufficient dimensions for enveloping and protecting said cables.

4. The mechanism according to claim 1, wherein said support is made of plastic material.

5. The mechanism according to claim 1, wherein said X-shaped support includes plates for fixing said support to said rails.

6. The mechanism according to claim 1, wherein said X-shaped support defines four branches, and said mechanism further comprises an arm supported by one of said branches, said arm supporting a lock, and an element supported by said support, said element supporting a handle for selectively actuating said lock.

7. The mechanism according to claim 1, wherein said support comprises an arm carrying a speaker.

8. A vehicle door assembly comprising:
- a door frame;
- a support member that is supported on said door frame;
- a first rail having a first end and a second end, each of said ends being supported by said support member;
- a second rail spaced from said first rail and having a first end and a second end, each of said ends being supported by said support member; and
- a cable moveably supported by said rails for movement relative to said rails, said cable having a first portion that extends between said rails and a second portion that extends between said rails, said first and second portions overlapping at a point between said rails, and wherein said first and second cable portions are received within said support member.

9. The assembly of claim 8, wherein said first cable portion extends from said first end of said first rail toward said second end of said second rail and said second cable portion extends from said first end of said second rail toward said second end of said first rail.

10. The assembly of claim 9, wherein said first and second cable portions form a generally X-shaped arrangement.

11. The assembly of claim 10, wherein said support member is generally X-shaped.

12. The assembly of claim 11, wherein said support member includes two intersecting generally tubular members that are made from a plastic material.

13. The assembly of claim 8, wherein said door frame includes a plurality of mounting tabs and said support member is fixedly secured to said mounting tabs.

14. The assembly of claim 8, wherein said rails and said support member encase a substantial portion of said cable and said cable is made from a metal material and has no external casing supported on said metal material.

15. The assembly of claim 8, wherein said rails and said support member are made from a plastic material and said support member has a generally X-shaped configuration with a first end supporting said first end of said first rail, a second end supporting said second end of said first rail, a third end supporting said first end of said second rail and a fourth end supporting said second end of said second rail such that said first and second rails are generally parallel and on opposite sides of said support member.

* * * * *